United States Patent [19]

Meyer et al.

[11] Patent Number: 4,474,856
[45] Date of Patent: Oct. 2, 1984

[54] GLASS SPANDREL PRODUCT

[75] Inventors: John H. Meyer, Milford; Salvatore Guerra, Detroit, both of Mich.

[73] Assignee: Ford Motor Company, Dearborn, Mich.

[21] Appl. No.: 497,436

[22] Filed: May 27, 1983

Related U.S. Application Data

[63] Continuation of Ser. No. 326,968, Dec. 2, 1981, abandoned.

[51] Int. Cl.³ .............................................. B32B 17/10
[52] U.S. Cl. ..................................... 428/426; 428/441
[58] Field of Search ................. 428/34, 426, 430, 441, 428/442, 515, 437; 427/208.2

[56] References Cited

U.S. PATENT DOCUMENTS

| | | | |
|---|---|---|---|
| 2,400,139 | 5/1946 | Roland | 428/441 |
| 4,128,694 | 12/1978 | Fabel et al. | 428/437 |
| 4,232,080 | 11/1980 | Orain et al. | 428/437 |
| 4,242,403 | 12/1980 | Mattimoe et al. | 428/437 |

FOREIGN PATENT DOCUMENTS 1315489  5/1973  United Kingdom ................ 428/442

Primary Examiner—Paul J. Thibodeau
Attorney, Agent, or Firm—William E. Johnson; Olin B. Johnson

[57] ABSTRACT

This specification is directed to a glass spandrel product which finds particular utility as a device for enclosing a building. In accordance with preferred teachings of the invention, the new product includes light-transmitting glass sheet having first and second surfaces. A tape is also provided which is attached to one of the surfaces of the light-transmitting glass sheet. The tape is formed from an organic based strip material having good elongation strength and tensile strength characteristics and an organic adhesive which bonds the strip material to the surface of the glass sheet. The organic based strip material may be of a selected color so that the glass sheet has a desired color when viewed through the surface not having the tape bonded thereto.

1 Claim, 3 Drawing Figures

GLASS SPANDREL PRODUCT

This application is a continuation of application Ser. No. 326,968, filed Dec. 2, 1981, now abandoned.

TECHNICAL FIELD

This invention is directed to a glass spandrel product and, more particularly, to a glass spandrel product which may be used for enclosing the outer surfaces of a building structure.

BACKGROUND ART AND PRIOR ART STATEMENT

No search was conducted on the subject matter of this specification in the U.S. Patent Office. The best prior art of which we are aware is discussed in detail in a subsequent portion of this specification. Suffice it to say at this point that the prior art product which our new product replaces is a product which costs a great deal more to manufacture than the product of our invention. The prior art product to be described is also a product which has inferior wear characteristics than the product taught herein.

DISCLOSURE OF THE INVENTION

This invention relates to a new product of manufacture and, more particularly, to a new product of manufacture which is a glass spandrel product that has particular utility in enclosing building structures.

This new product of manufacture comprises the following elements. A light-transmitting glass sheet is provided which has first and second surfaces. An organic based strip material is also provided. This organic based strip material must have good elongation strength and good tensile strength characteristics. An organic adhesive is used to bond the organic based strip material to one surface of the light-transmitting glass sheet.

The organic based strip material provides strength to the light-transmitting glass sheet when that sheet is subjected to heavy loads. Also, if the glass sheet should rupture, the organic based strip material and organic adhesive coact to hold the fragmented glass sheet together so that individual particles of the glass sheet generally do not separate from one another. The organic based strip material and/or the organic adhesive may also be colored to a desired color so that when one looks through the surface not having the organic based strip material thereon, a particular color is achieved for the product.

In a preferred embodiment, the organic based strip material and organic adhesive are formed into a single tape element.

BRIEF DESCRIPTION OF THE DRAWINGS

The novel features that are considered characteristic of the invention are set forth with particularity in the appended claims. The invention, itself, however, both as to its organization and its method of operation, together with additional objects and advantages thereof, will best be understood from the following description of specific embodiments when read in connection with the accompanying drawings, wherein like reference characters indicate like parts throughout the several figures, and in which:

BEST MODE AND INDUSTRIAL APPLICABILITY

The following description is what we consider to be a preferred embodiment of our new product of manufacture. The following description also sets forth what we now contemplate to be the best mode of making this new product of manufacture. This description is not intended to be a limitation upon the broader principles of this method, and, while preferred materials are used to illustrate the manufacture of this new product of manufacture in accordance with the requirements of the patent laws, it does not mean that the product can be manufactured only with the stated materials, as others may be substituted therefor.

Figure 1:
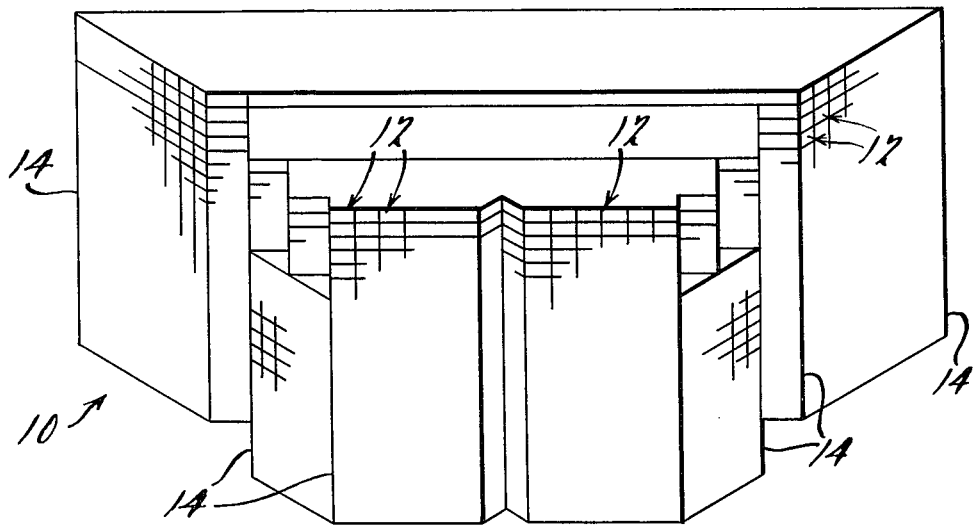
FIG. 1 is a perspective view, in elevation, of a building which is enclosed by a plurality of glass spandrel units and vision units.

In FIG. 1 there is seen a building structure generally designated by the numeral 10. The building is enclosed by a plurality of glass units generally designated by the numeral 12. Some of the glass units 12 are visually transparent to provide the windows for the floors of, for example, office space. Others of the glass units 12 will be opaque, that is, non-light-transmitting, because they are located in positions between floors which define areas of a building containing the structural steel and other mechanical elements thereof. However, it is important that when the building is viewed from the exterior, the glass units 12, whether transparent or opaque, must all have the same color.

Also, because of the design of the building 10, some of the glass units 12 are located in so-called "hot" areas of the building in which greater loads from winds are placed thereon than in other areas. For example, sharp corners of the building, such as designated by the numeral 14—14, require glass units of greater strength. Greater strength is required because of the manner in which the winds move over the surface of these glass units. Such winds create different aerodynamic pressures which in turn place different loads on these corners than the loads placed on other exterior, generally flat surfaces of the building structure 10.

It is a principal object of this invention to provide as a new product of manufacture a glass spandrel product which has two principal characteristics. As a first characteristic, the glass spandrel product is designed so that it is opaque to light transmission; but yet when viewed from the exterior of the building structure 10, is of the same color as a glass unit which is transmitting light therethrough. As a second characteristic, the glass spandrel product is one which is capable of sustaining the forces encountered in so-called "hot" locations of a building structure where aerodynamic loads on the glass spandrel are greater than in those locations of the building structure having generally plainer construction.

Figure 2:
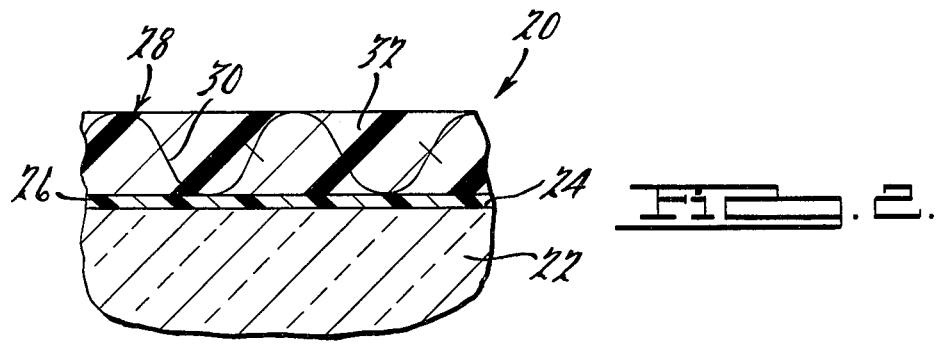
FIG. 2 is a view in cross-section of a prior art glass spandrel product which has been used in enclosing buildings, particularly at areas of the building which bear high wind loads.

In FIG. 2 there is seen a prior art product generally designated by the numeral 20 which was used in forming glass spandrels 12 for the sharp corners 14 in building structure 10. This prior art product 20 included a transparent glass substrate 22 having a surface 24 upon which a coating 26 was applied. The purpose of this coating 26 was to hide a subsequent layer of material that provided additional strength to the transparent glass substrate 22 and to match the external appearance of the vision unit to the spandrel unit. The coating 26 could be a paint coating applied in a paint operation, or a frit coating which is applied in a spraying, curtain coating or silk screening operation. Both paint coating of glass and frit or enamel coating of glass are well known in the art and no further description thereof will be provided herein.

On top of the coating 26 was provided a so-called "scrim" coating generally designated by the numeral 28. The scrim coating 28 is formed from a mesh-like or screen-like fabric 30 embedded in a suitable adhesive 32. The mesh or screen-like fabric, for example, could be a gauze cloth material. The adhesive material could be a material such as 3M—4230 adhesive. In order to form the scrim coating 28, the exposed surface of the coating 26 has adhesive applied thereto, for example, by a brushing or spraying operation. Thereafter, the mesh or screen-like fabric 30 is pushed into the adhesive and the adhesive is allowed to cure thereby forming the scrim coating 28.

This product inherently has a cost penalty involved in it because of the large amount of labor required to product it. For example, the process is a two-step process in that the coating 26 must first be applied to the surface 24 of the transparent glass substrate and then in a second operation the scrim coating 28 is applied to the coating 26. Such a two-step operation inherently involves labor associated with handling the product between two processing stations and delay times involved in curing of the coating materials applied.

The product manufactured in accordance with the prior art also has another disadvantage in that the scrim coating 28 is applied not directly to the transparent glass substrate 22, but to an intermediate coating 26 which has been placed on the glass substrate. This can weaken the bonds between the three different layers of materials thereby reducing the overall strength of the finished prior art product 20. Testing of bond strength may be carried out by subjecting the product 20 to a humidity test in which the product is exposed to a 100% relative humidity at a temperature of 50° C. for a period of six weeks.

We have found that when such a product 20 is tested in this environment for as little as one day, the adherence of the various coating proves poor and it is relatively easy to remove the scrim coating 28 from the coating 26 therebelow. This leads us to believe that if the product was installed in a building structure 10 and subjected to humidity conditions for a prolonged period of time, the scrim coating 28 may be so weakened that if the glass substrate 22 is ruptured, the scrim coating will not serve its intended purpose, that is, to hold the fragmented pieces of glass substrate in a unitary mass.

Figure 3:
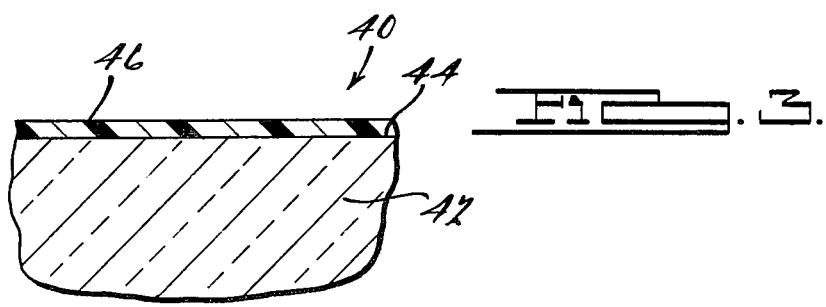
FIG. 3 is a view in cross-section of a glass spandrel product in accordance with our invention which is designed as a replacement product for the glass spandrel product shown in FIG. 2.

To overcome the disadvantages of the prior art product 20, and also to provide a new glass spandrel product at a reduced cost, we have developed a new product of manufacture generally designated by the numeral 40 in FIG. 3. This new product of manufacture may be used for forming at least those glass spandrels 12 in the building structure 10 which are located at the sharp corners 14 thereof which are required to withstand substantial aerodynamic stresses thereon. The new product of manufacture 40 may also be used in forming those glass spandrels 12 of the building structure 10 which must be opaque, but which must also have the color characteristics of the transparent glass spandrel when viewed from the exterior of the building structure 10.

This new product of manufacture 40 includes a light-transmitting glass sheet 42 which has a first surface (not shown) and a second surface 44. In accordance with the teachings of a preferred embodiment of this invention, the second surface 44 has a tape 46 applied thereto. The tape is formed from an organic based strip material having good elongation strength and tensile strength characteristics and an organic adhesive which is applied to the strip material in the normal way of manufacturing a tape product. The organic adhesive material would be located between the organic based strip material and the second surface 44 of the light transparent glass sheet 42.

In the preferred embodiment of the new product of manufacture 40, the light-transmitting glass sheet is a sheet of body colored glass having a generally green color when viewed under normal lighting conditions. This glass sheet is tempered in a tempering operation such as is well known to the skilled artisan so that if it is broken, it will break into a number of dull-edged, blunt pieces. The light-transmitting glass sheet may have a metallic oxide coating placed on either its first surface or its second surface for the purpose of generating a particular reflective characteristic for the entire spandrel or a different color hue for the entire spandrel. This metal oxide coating may be applied as known in the art and is an optional coating.

In accordance with the preferred embodiment of the new product of manufacture 40 of this invention, the tape 40 is formed from a polypropylene based strip material which has good elongation strength and tensile strength characteristics. By good elongation strength and tensile strength characteristics, we mean that the tape will elongate at least 25% under load conditions before tearing and will have a tensile strength of at least two pounds per square inch before giving away under loaded conditions. Other organic materials may form the strip material, such as polyethylenes and polyesters. However, polypropylene is the preferred material, especially if the glass spandrel product is going to be used in high humidity conditions.

The adhesive used for the tape 46 is preferably an acrylic adhesive such as a butyl methacrylate. Other acrylic adhesive may be used such as an anaerobic adhesive. Such tapes are supplied by 3M Company.

It is also possible to color the strip material to a desired or selected color so that when it is bonded to the light-transmitting glass sheet, the overall product of manufacture 40 will have a desired color characteristic when viewed through the surface not having the tape bonded thereto. In this manner, the tape may be used to adjust the color of the light-transmitting glass sheet so that opaque panels appear to be the same color as light-transmitting spandrels when viewed from a building exterior. The adhesive may also be colored for this same purpose. Also, coloring of the adhesive may be of value in blocking harmful U.V. rays from damaging the adhesive or tape.

We have tested new products of manufacture made in accordance with the teachings of this invention and have found that they are capable of withstanding extreme humidity conditions. For example, a glass spandrel placed in a humidity cabinet at a temperature of 50° C. and 100% humidity had no effect on the new product 40 after 1000 hours. Also, when this product was subjected to ultraviolet radiation for 100 hours, there was no observable effect on the product.

Another thing that was of extreme importance to us in our new product of manufacture 40 was the ease of manufacture of the product. It is only necessary in a single operation to apply the tape 46 to the second surface 44 of the light-transmitting glass sheet 42 in order to produce the new product 40. There is no two-step processing and no waiting between steps of the process as is required to manufacture the prior art product 20.

There are a few things that should be considered from a secondary standpoint with respect to the new product of manufacture described in this specification. In many situations, the transparent glass sheet to which the tape is applied will have a metallic oxide coating on the surface thereof to which the backing material is applied. The purpose of this metallic oxide coating is to change the reflectance characteristics of the glass product. In the situation in which the "scrim" coating of the prior art was placed on the surface of the glass having the metallic oxide thereon, if an enamel frit coating was used to screen out the scrim coating, there was an interaction between the enamel and the metal oxide film which gave an unacceptable appearance to the finished product. The finished product had splotchy areas and other defects therein.

With the product of our invention, placing tape over a metallic oxide coating does not produce any undesirable interaction. Thus, our product has the secondary advantage that it may be made from a transparent glass sheet having a metal oxide coating thereon and no undesirable characteristics will be developed for that product.

As an additional matter, with our product it is possible to avoid heat treatment of the glass. In other words, the transparent glass sheet is left in its annealed form and the tape is applied directly thereto. Since it is not necessary to heat the transparent glass sheet in order to temper the same, there is a saving on energy and an avoidance of possible distortion or warpage that often occurs during heat treatment of the transparent glass sheet.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

We claim:

1. A new product of manufacture which consists of two structures:
   a light transmitting glass sheet having first and second surfaces; and
   a tape, said tape being formed from (1) a polypropylene strip material having a good elongation strength in that said polypropylene strip material will elongate at least 25% under load conditions before tearing and a good tensile strength characteristic in that said polypropylene strip material will have a tensile strength of at least two pounds per square inch under load conditions, said polypropylene strip material being of a selected color so that said light transmitting glass sheet has a desired color when viewed through the surface of said glass sheet not having said polypropylene strip material bonded thereto, and (2) an organic adhesive bonding said polypropylene strip material to one of said surfaces of said light transmitting glass sheet.

* * * * *